L. A. YOUNG.
VEHICLE WHEEL.
APPLICATION FILED APR. 4, 1913.
1,125,627.
Patented Jan. 19, 1915.
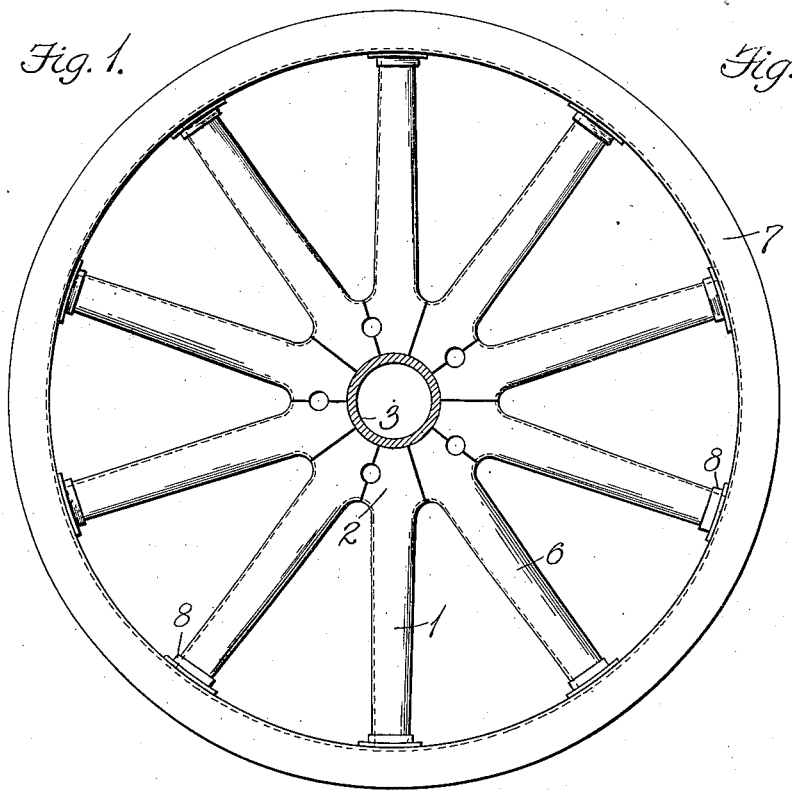
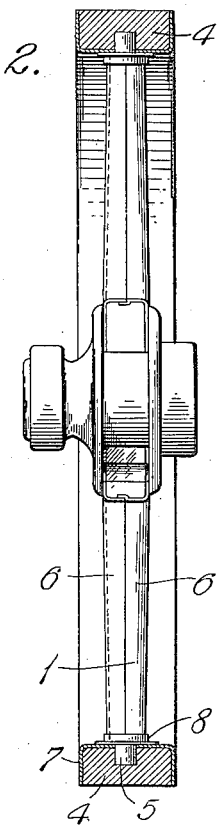
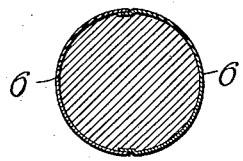
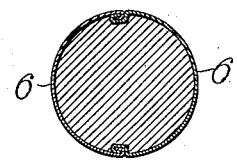
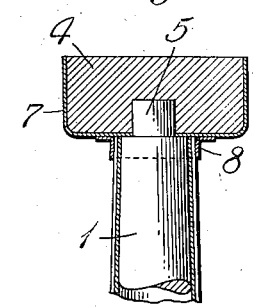
Witnesses
Chas. W. Stauffiger
Anna M. Dorr
Inventor
Leonard A. Young,
By
Attorneys

UNITED STATES PATENT OFFICE.

LEONARD A. YOUNG, OF DETROIT, MICHIGAN.

VEHICLE-WHEEL.

1,125,627.   Specification of Letters Patent.   Patented Jan. 19, 1915.

Application filed April 4, 1913.   Serial No. 758,787.

*To all whom it may concern:*

Be it known that I, LEONARD A. YOUNG, a citizen of the United States of America, residing at Detroit, in the county of Wayne and State of Michigan, have invented certain new and useful Improvements in Vehicle-Wheels, of which the following is a specification, reference being had therein to the accompanying drawings.

In the construction of wheels for vehicles, and more particularly those used for traction and guiding purposes, as in automobiles or the like, provision must be made for resisting side thrust and torque, as well as the usual rolling load of vehicles that are not self propelled. If the wheel for such purpose is constructed of wood, it necessitates the use of stock that is very tough and is capable of withstanding a high shearing strain. If metal, and more particularly sheet metal, is employed, it is so liable to be dented under ordinary use that it quickly yields to side strain and becomes deformed. Thus it loses the strength or rigidity which its original form gives it, so that it collapses.

This invention relates to vehicle wheels and a method of making them whereby the necessary strength and ability to resist the various strains and blows to which they are subjected, are obtained by the use of material that is comparatively easy to provide and to work into shape.

The invention consists in the matters hereinafter set forth, and more particularly pointed out in the appended claims.

In the drawings, Figure 1 is a view, partially in elevation and partially in section, of a wheel that embodies features of the invention and is produced by the method that also is a part of the invention. Fig. 2 is a view in section, parts being as shown in elevation, of the wheel; Fig. 3 is a view in detail, enlarged, showing the method of uniting the sheathing of a spoke and felly; Fig. 4 is a view in cross-section, showing the line of view III—III on which Fig. 3 is taken; and Fig. 5 is a view in detail in section of a modification of a spoke sheathing joint.

The method consists in first forming the hub and body of a wheel of spokes of wood or light material, which while it possesses strength to resist the end pressures occasioned by a rolling load, does not necessarily have the requisite toughness to avoid breaking under the shearing strains occasioned by side pressure and torque. It is preferable that the hub be formed by the contacting tapered shanks of the spokes abutting around a barrel of metal which is adapted either to directly engage an axle skein or to carry suitable bearing members which are themselves adapted for operative engagement with such skein, or companion bearings. A felly of the same material as the bodies of the spokes is likewise formed up and is recessed in the usual manner to receive tenons that are formed on the spoke extremities. A sheathing of sheet metal is then forced around each spoke, the portion that covers the shank thereof being adapted to closely contact with the adjacent sheathing so that the entire body of the wheel is incased. A similar sheathing is also placed on the inner and side faces of the felly, and the wheel is then assembled, suitable collars or flange members being used to reinforce the sheathing at the joints between the spoke ends and the contacting portions of the felly. The hub plates are then applied and are held by the usual securing bolts that pass through apertures at the contacting faces of the shanks, as is usual in good wheel construction. As shown in the drawings, a wheel that is produced by this method consists of a series of spoke bodies 1, of wood or the like, having shanks 2 whose inclined faces are radial to a hub sleeve 3 around which the spokes are assembled in contacting relation. A felly body 4 is likewise formed of wood or other suitable material and is provided with recesses for tenons 5 which are formed on the spoke ends. A sheathing of sheet metal is then forced or pressed around the body of the wheel. While this may be of a single piece formed up or stamped from sheet metal, one such for each side of the wheel, the preferred sheathing is made of two members 6 each covering half a spoke and the exposed faces of the shank thereof, the edges of the shank portions or companion spokes being in abutting relation while the longitudinal margins of the spoke sections overlap. The seam formed by the overlying margins is preferably as shown in Fig. 4, the parts being intimately connected by electric welding, either in spots or for the entire length of each seam. Or, the seam may be of the lock type shown in Fig. 5, and other familiar sheet metal joints may be used if desired. The felly 4 is likewise covered with a casing of sheet metal 7. The incased felly and nave are then assembled, and the joint between each spoke casing and the felly sheath is preferably reinforced as by flange or collar 8. The joints between the contacting metal parts are either welded, brazed, soldered, or otherwise intimately secured.

By the use of the sectional sheathing for the body of the wheel, that is, a separate casing for each spoke, and the necessary forcing of the casing over the smaller end of each spoke toward the shank, a close seating of the sheathing on the body of each spoke is insured, so that the body of the wood backs the sheathing against accidental indentation, and the ability of the sheathing to resist lateral strain and shearing load is maintained. As the body of the spoke may be of comparatively easily worked wood, the cost of the construction is greatly cheapened, while the wheel as a whole presents an exterior which may be finished the same as if of the usual hard woods from which wheels are formed. The proportions of the standard wheel are preserved, and the strength and durability thereof greatly augmented by this method of construction.

Obviously, changes in the details of construction may be made without departing from the spirit of the invention, and I do not care to limit myself to any particular form or arrangement of parts.

I claim:—

1. A vehicle wheel comprising a nave formed of a hub barrel and radial spokes of wood having tapered contacting shanks abutting around the barrel, a sheet metal sheathing incasing the spokes and shanks consisting of sections embracing the spokes and shank portions thereof, the margins of the portions embracing the spoke bodies having their contacting edges permanently engaged and the adjacent marginal portions that cover the shanks having their margins secured in abutting relation, and a felly to which the spokes are tenoned, and a sheet metal sheathing for the felly secured to the sheathing of the spokes.

2. A vehicle wheel comprising a hub barrel, spokes of suitable material extending radially from the hub barrel, and having tapered shanks forming with the barrel, a hub, a sheathing for each spoke consisting of two sheet metal sections secured together along their longitudinal margins with the shank portions of the sections having their adjacent margins secured in abutment and a felly secured on the spokes, and a sheet metal sheathing on the felly secured to the adjacent portions of the spoke sheathings.

3. A vehicle wheel comprising a hub barrel, spokes of wood or like material extending radially from the hub barrel, and having tapered shanks forming with the barrel, a hub, a sheathing for each spoke consisting of two sheet metal sections secured together along their longitudinal margins, along the spoke bodies and connected to adjacent sections of component spokes along the shanks and a felly on the spokes.

In testimony whereof I affix my signature in presence of two witnesses.

LEONARD A. YOUNG.

Witnesses:
OTTO F. BARTHEL,
ANNA M. DORR.